Aug. 12, 1969 V. SUBOVICI 3,460,367

LAMINATED MAGNETIC CORE AND PROCESS FOR MAKING SAME

Filed Sept. 7, 1965

Vadim Subovici
INVENTOR.

BY

Karl J. Ross
Attorney 3,460,367
LAMINATED MAGNETIC CORE AND PROCESS FOR MAKING SAME
Vadim Subovici, Bucharest, Rumania, assignor to Ministerul Industriei Constructiilor De Masini, Bucharest, Rumania, a corporation of Rumania
Filed Sept. 7, 1965, Ser. No. 485,481
Int. Cl. B21d *43/28;* B21k *27/06;* B21b *1/00*
U.S. Cl. 72—324                                         2 Claims

ABSTRACT OF THE DISCLOSURE

Laminated magnetic core made from sheet steel, each lamina having a surface covered with an insulating layer and formed with cuts in the shape of V-grooves with plastic deformation of the steel and inward bending of portions of the insulating layer along the sides of the grooves, the inwardly bent portions decreasing progressively in thickness toward the bottom of each groove, effective insulation being thus maintained between adjacent laminae despite the existence of discontinuities in the insulating layer.

---

My present invention relates to a laminated magnetic core, made by stacking or coiling from ferromagnetic steel sheets or strips which are mutually insulated by the presence of a dielectric layer on a surface of each lamina.

In order to minimize the generation of eddy currents in such cores, it is known to form a series of parallel cuts across the surfaces of the several laminae. If these grooves cut through the insulating layers, close juxtaposition of the laminae may result in insufficient mutual insulation in the region of each cut.

The object of my invention is to provide an improved core structure avoiding this disadvantage as well as a process for producing such a structure in a simple operation.

In accordance with this invention, the ferromagnetic sheet material with its insulating layer is scored with the aid of a blunt implement which forms grooves of generally triangular profile (usually referred to as V-grooves) in the layer-covered surface of the sheet, the depth of each groove being substantially greater than the thickness of the insulating layer. This scoring action cuts through the insulating layer and plastically deforms the underlying metal, with inward bending of portions of the layer along the sides of the groove, the inwardly bent portions decreasing progressively in thickness toward the bottom of the groove. Thus, the flanks of the groove are covered with insulation to a depth sufficient to prevent conduction between the juxtaposed laminae even if the insulating layer is relatively thin.

The invention will be described in greater detail with reference to the accompanying drawing in which.

Figure 1A:
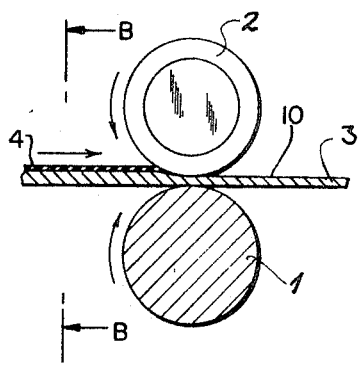
FIG. 1A is a cross-sectional view of a device for making a magnetic-core structure according to the invention.
Figure 1B:
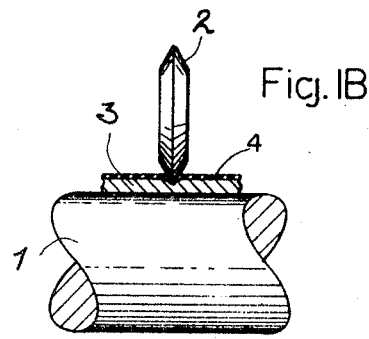
FIG. 1B is a view on the line B—B of FIG. 1A.
Figure 2:
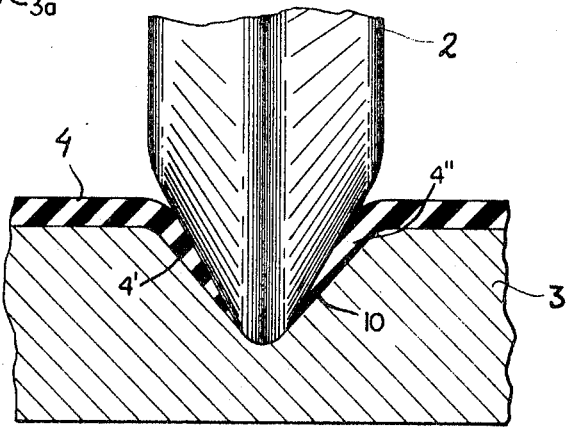
FIG. 2 is a view similar to part of FIG. 1B, drawn to a larger scale.

FIGS. 1A and 1B show a ferromagnetic steel sheet 3 covered on one surface with an insulating layer 4, this sheet being fed between an elongated lower roller 1 and a scoring roller 2 of generally wedge-shaped but blunt profile. The relative rotation of scoring roller 2 and counterroller 1, in mutually opposite directions as indicated by the arrows in FIG. 1A, results in the formation of a groove 10 whose depth substantially exceeds the thickness of layer 4 as best seen in FIG. 2. The latter figure also shows that the metal sheet 3 is plastically deformed by the tool 2 and that portions 4', 4" of layer 4 are bent inwardly along the sides of groove 10, these portions extending well into the profile of the groove and tapering toward the bottom thereof while still being of appreciable thickness over the major part of each flank.

Figure 3:
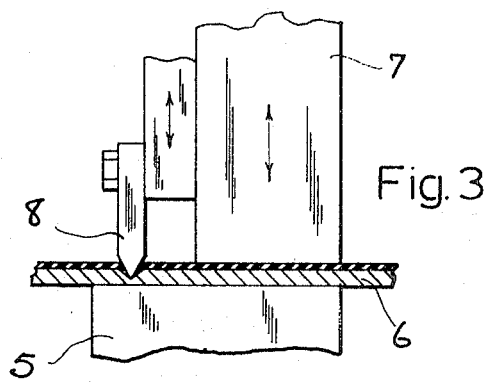
FIG. 3 is a view similar to FIG. 1A, showing a modified apparatus.

As illustrated in FIG. 3, a sheet 6 similar to sheet 3 may be placed on a flat bed 5 underneath a vertically reciprocating ram 7 which carries a scoring tool 8 of the same general profile as roller 2; ram 7, on descending, clamps the sheet 6 in place and also limits the depth of penetration of the tool 8 which penetrates the insulating layer and plastically deforms the sheet to produce a groove as previously described.

Figure 4:
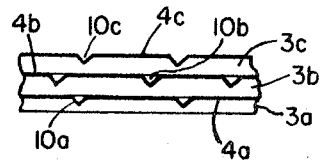
FIG. 4 is a fragmentary view of a magnetic core consisting of sheet metal produced by apparatus as shown in the preceding figures.

FIG. 4 shows part of a laminated core, for use in transformers or other electrical equipment, whose juxtaposed laminae 3a, 3b, 3c are covered by insulating layers 4a, 4b, 4c and are formed with grooves 10a, 10b, 10c as described above; these grooves form small air gaps between the adjoining laminae and inhibit the circulation of eddy currents within the laminations. Elements 3a, 3b, 3c may be separate sheets stacked together or parts of a single coiled strip.

I claim:
1. A method of making an element of a magnetic core, comprising the steps of producing a ferromagnetic sheet with an insulating layer on a surface thereof, and forming a groove of generally triangular profile across said surface by plastic deformation of said sheet with inward bending of portions of said layer toward the opposite surface along the sides of the groove, the depth of said groove being made substantially greater than the thickness of said layer.
2. A method as defined in claim 1 wherein said inwardly bent portions are progressively thinned toward the bottom of the groove.

References Cited

UNITED STATES PATENTS

| | | | |
|---|---|---|---|
| 1,313,054 | 8/1919 | Berry | 29—155.59 |
| 1,877,254 | 9/1932 | Ritter | 29—155.61 |
| 2,552,109 | 5/1951 | Nahman | 29—155.61 |
| 3,271,718 | 9/1966 | Shaw | 29—155.61 |

CHARLES W. LANHAM, Primary Examiner

E. M. COMBS, Assistant Examiner

U.S. Cl. X.R.

29—607, 625; 72—365, 377, 379; 335—296; 336—219